US008417375B2

(12) United States Patent
Horev et al.

(10) Patent No.: US 8,417,375 B2
(45) Date of Patent: Apr. 9, 2013

(54) COUNTING MACHINE FOR DISCRETE ITEMS

(75) Inventors: Noam Horev, Kibbutz Ramat Rachel (IL); Zvi Weinberger, Jerusalem (IL)

(73) Assignee: Data Detection Technologies Ltd., Jerusalem (IL)

( * ) Notice: Subject to any disclaimer, the term of this patent is extended or adjusted under 35 U.S.C. 154(b) by 526 days.

(21) Appl. No.: 12/800,349

(22) Filed: May 13, 2010

(65) Prior Publication Data

US 2011/0282488 A1 Nov. 17, 2011

(51) Int. Cl.
*G06F 7/00* (2006.01)

(52) U.S. Cl. ........................................................ 700/230

(58) Field of Classification Search .................. 700/213, 700/230

See application file for complete search history.

(56) References Cited

U.S. PATENT DOCUMENTS 4,382,527 A 5/1983 Lerner
4,843,579 A 6/1989 Andrews et al.
5,317,645 A 5/1994 Prozek et al.
5,473,703 A 12/1995 Smith
5,768,327 A 6/1998 Pinto et al.
6,181,979 B1 * 1/2001 Murakami .................... 700/216
6,253,953 B1 7/2001 Ishizuka
6,449,927 B2 9/2002 Hebron et al.
6,631,826 B2 10/2003 Pollard et al.
6,659,304 B2 12/2003 Geltser et al.
6,945,383 B2 * 9/2005 Pham ............................ 198/495
7,795,556 B1 * 9/2010 Dean ............................. 209/580
2003/0222091 A1 12/2003 Gerold et al.
2004/0154688 A1 8/2004 Geltser et al.
2005/0263537 A1 12/2005 Gerold et al.
2008/0173649 A1 7/2008 Sus et al.
2009/0177316 A1 7/2009 Schedel et al.
2010/0205002 A1 8/2010 Chambers

FOREIGN PATENT DOCUMENTS

DE 20214431 U 2/2004
DE 102009052292 4/2011
EP 1083007 3/2001
EP 759815 10/2002
EP 1852372 11/2007
JP 2132011 5/1990
WO 2011054974 5/2011

* cited by examiner

*Primary Examiner* — Ramya Burgess
(74) *Attorney, Agent, or Firm* — Roach Brown McCarthy & Gruber, P.C.; Kevin D. McCarthy

(57) ABSTRACT

A method for dispensing a set number of items as a batch comprising the steps of: setting the set number of items in a batch; calibrating by forwarding items along a conveyor for a time interval; counting the number of items to fall off end of feeder in that time interval; calculating throughput per unit time; setting the conveyor to operate for a discrete time period calculated to approach but not exceed that required so that the running total reaches nut does not exceed the set number without otherwise adjusting conveyor settings; counting the number of items dispensed in the discrete time period; adding the number of items to fall off feeder in the discrete time period to running total, and repeating steps until the running total is greater or equal to the batch size wherein each iteration uses the number of particles per unit time in the preceding time period as basis for determining item through rate for calculating subsequent time period for operating the conveyor.

12 Claims, 3 Drawing Sheets

COUNTING MACHINE FOR DISCRETE ITEMS

FIELD OF THE INVENTION

The present invention is directed to an apparatus and associated method for counting discrete items such as particulate material that is particularly useful for dispensing pills into vials or bottles, but also for seeds, grains, and even irregularly shaped and sized articles such as diamonds and the like.

BACKGROUND OF THE INVENTION

It is frequently necessary to dispense particulate matter into batches of known size and there are many machines and systems for so doing.

One type of machine for dispensing quantities of particulate materials consists of a hopper connected to a forwarding mean such as a vibratory conveyer which creates a fairly steady pouring of the particles.

For pouring set quantities of regular particles such as the proverbial carob seeds which are very standard in same and shape, wear resistant and rarely broken, and thus became the standard for weighing precious stones (the Karat), dispensing by weight is a viable option. For less standard items, this is not a satisfactory option.

By way of example, it may be required to sort rough diamonds into packages of approximately equal samples, perhaps to enable different evaluators to estimate the quality and worth of the whole. It will be appreciated that a random sample of diamonds follows a Weibull distribution. Weight is less than satisfactory as a means of batching, and counting is desired. Indeed, even if batched by weight, accurately counting the number of particles in the sample is extremely important.

For items that are brittle and easily broken, such as many medicines that are dispensed in tablet form, broken items make counting unsatisfactory for dosing purposes, particularly since there may be desire to know how many broken tablets are within a sample, and these may even be considered as scrap, so batches are required to have preset amounts of whole tablets. Essentially in such scenarios, the number of broken items (pills, tablets) is irrelevant, provided broken items can be identified during the pouring and discounted from the total. Nevertheless, it may be very important for all batches to contain their compliment of pills, but a few extra can be extremely expensive and wasteful.

U.S. Pat. No. 5,473,703 to Smith titled "Methods and apparatus for controlling the feed rate of a discrete object sorter/counter" describes an object sorter/counter for controlling the feed rate of a sorter/counter that includes a feed bowl which is oscillated by an adjustable amplitude vibrator, and an exit assembly having a chute with a sensor array for registering the passage of objects through the exit assembly.

The feed bowl is provided with a shutter which interposes a photo-detector and a light source so that light from the light source is blocked from detection by the photodetector intermittently as the feed bowl oscillates. A circuit coupled to the photodetector generates a series of pulses having widths inversely proportional the amplitude of bowl oscillation. A controller adjusts the vibrator to oscillate the feed bowl at a predetermined amplitude until the sensor array senses a first object. The controller then adjusts the vibrator to oscillate the feed bowl at a lower amplitude and monitors the sensing of other objects. Time intervals between objects being sensed are monitored and the controller adjusts the vibrator to oscillate the feed bowl at a lower or higher amplitude to maintain a constant feed rate. A count of objects sensed is maintained and compared to a predetermined maximum count. When the count of objects equals a predetermined number less than the maximum count, the controller adjusts the vibrator to oscillate the feed bowl at a lower amplitude to lower the feed rate. When the count of objects equals the maximum count, the controller activates a gate closing the chute.

The above system pours at an ever lower rate as the pouring gets closer to the total. This creates bottlenecks. Each pouring cycle is an individual activity that is time consuming, adding to the cost of production.

U.S. Pat. No. 6,659,304 to Geltser and Gershman, titled "Cassettes for systems which feed, count and dispense discrete objects" describes a high capacity cassette for an object counting and dispensing system, that includes a substantially horizontal base including an exit hole, a peripheral wall about the base and having an internal periphery, the base and the peripheral wall defining a reservoir adapted to store a plurality of the discrete objects, and a structure about the internal periphery which feeds the discrete objects in single file toward said exit hole.

It will be appreciated that feeding discrete objects in single file, i.e. pouring pills one at a time, enables extremely accurate counting. It is, however, not fast, and the throughputs of this and similar systems is not high. This means that efficiencies are low. Indeed, the dispensing is often the bottleneck of manufacturing plants of this type, and thus contributes significantly to the cost of the product.

It will be appreciated that there is a general need for increased accuracy in counting, particularly to minimize other-shooting the desired total, whilst speeding up the counting and dispensing process.

To determine the actual number of objects poured, it is useful to film the falling objects. By monitoring objects interrupting the illumination of a light source onto a pixilated array, it is possible to count objects being poured in real time. Such systems, including both feeder and optical system, are known.

For example, U.S. Pat. No. 5,768,327 to Pinto et al. titled "Method and apparatus for optically counting discrete objects" describes an object counter includes a feeding funnel having a frustroconical section, the narrow end of which is coupled to a substantially vertical feeding channel having a substantially rectangular cross section. A pair of linear optical sensor arrays are arranged along adjacent orthogonal sides of the feeding channel and a corresponding pair of collimated light sources are arranged along the opposite adjacent sides of the feeding channel such that each sensor in each array receives light the corresponding light source. Objects which are placed in the feeding funnel fall into the feeding channel and cast shadows on sensors within the arrays as they pass through the feeding channel. Outputs from each of the two linear optical arrays are processed separately, preferably according to various conservative criteria, and two object counts are thereby obtained. The higher of the two conservative counts is accepted as the accurate count and is displayed on a numeric display. In another embodiment, four sensor arrays and light sources are provided. The third and fourth sensor arrays and corresponding light sources are located downstream of the first and second arrays. The outputs of each of the sensor arrays are processed separately and the highest conservative count is accepted as the accurate count and is displayed on a numeric display.

European Patent Attorney Number EP1083007 titled "Method and apparatus for sorting granular objects with at least two different threshold levels" describes a method and system wherein granular objects flowing in a continuous form are irradiated by light. The resulting image element signals from a solid-state image device are binarized by a threshold value of a predetermined luminance brightness determined for detecting a defective portion of a granular object of a first level, and the above image element signals are also binarized by a threshold value of a predetermined luminance brightness determined for detecting a defective portion of a second level. The second level is for a tone of color heavier than that of the first level. When a defective image element signal is detected from the binarized image elements, an image element of a defective granular object at the center location is specified and the sorting signal is outputted to act on the center location of the defective granular object corresponding to the image element at the specified center location. A granular object having a heavily colored portion which, even small in size, has influence to the product value can be effectively ejected. Sorting yield is improved by not sorting out the granular objects having a defective portion which is small and only lightly colored thus having no influence to the product value.

There is a general need for dosing systems and methods for dosing discrete numbers of objects into batches or samples that are fast and accurate. The present invention addresses this need.

SUMMARY OF THE INVENTION

In a first aspect, the present invention is directed to providing a method for dispensing a set number of items as a batch comprising the steps of:

(a) setting the set number of items in a batch;

(b) calibrating by (b1) forwarding items along a conveyor for a time interval;

(b2) counting the number of items to fall off end of feeder in that time interval;

(b3) calculating throughput per unit time (c) setting the conveyor to operate for a discrete time period calculated to approach but not exceed that required so that the running total reaches nut does not exceed the set number without otherwise adjusting conveyor settings;

(d) counting the number of items dispensed in the discrete time period of step c;

(e) adding the number of items to fall off feeder in the discrete time period of step c to running total, and (f) repeating steps c, d and e until running total is greater or equal to the batch size wherein each iteration uses the number of particles per unit time in the preceding time period as basis for determining item through rate for calculating subsequent time period for operating the conveyor.

In one embodiment, the objects are counted using an apparatus for optically counting discrete objects, comprising:

a) a substantially vertical feeding channel having an upper end for receiving the objects;

b) first and second substantially collimated light sources arranged substantially orthogonally, substantially horizontally, and adjacent said feeding channel;

c) first and second photo-electric sensor arrays arranged substantially orthogonally, substantially horizontally, and adjacent said feeding channel such that light from said first light source is detected by said first sensor array and light from said second light source is detected by said second sensor array, each of said sensor arrays having an output;

d) processing means coupled to said outputs of said first and second sensor arrays for separately processing said outputs; and e) numeric display means coupled to said processing means for displaying a total count of the objects, wherein the objects which enter said feeding channel pass between said light sources and said sensor arrays to cast shadows on said sensor arrays, said processing means detects said shadows on said sensor arrays by separately processing said outputs of said sensor arrays, determines separate counts of how many objects have cast shadows on each of said sensor arrays, consistently chooses the larger or smaller of said separate counts, and increments the numeric display by the amount of the chosen larger or smaller count.

In a preferred embodiment, the method is implemented by counting the items whilst falling, using an optical system comprising at least one light source incident on an individual pixilated array.

Optionally two non-collimated light source-array pairs arranged non-perpendicularly are used.

Preferably three light source-array pairs are used such that at least two light source-array pairs are not perpendicular to each other.

Optionally three light source-array pairs are used such that all three light source-array pairs are not perpendicular to each other.

Optionally, at least one light source uses non-collimated light.

Optionally, at least two light source uses non-collimated light.

Optionally, all three light source uses non-collimated light.

Optionally two of the light source-array pairs are arranged perpendicularly to each other in the same horizontal plane.

Preferably comparison of output of the pixilated arrays enables accurate determination of number of items, individual resolution of items falling together, and, shape of items.

In one application, the acceptable particles are approximately identical in size and shape, the rejected particles are clearly identified and their numbers in the sample is determinable.

Preferably, images of rejected particles from pixilated arrays are stored in a memory for subsequent analysis.

BRIEF DESCRIPTION OF THE FIGURES

For a better understanding of the invention and to show how it may be carried into effect, reference will now be made, purely by way of example, to the accompanying drawings.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention; the description taken with the drawings making apparent to those skilled in the art how the several forms of the invention may be embodied in practice. In the accompanying drawings.

DESCRIPTION OF PREFERRED EMBODIMENTS

Figure 1:
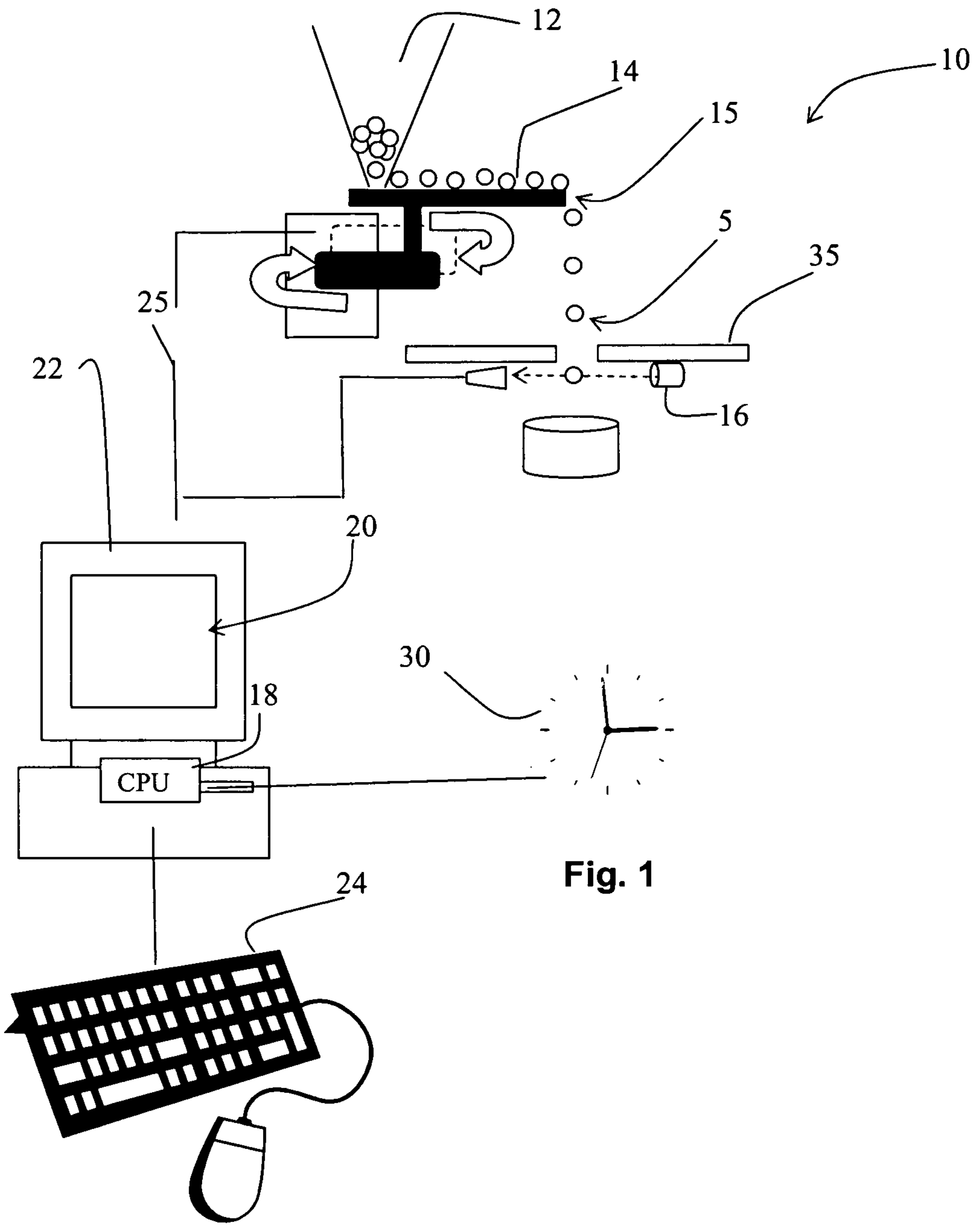
FIG. 1 is a schematic illustration of a system for dispensing items so that they can be counted.

With reference to FIG. 1, a schematic illustration of a system of the present invention is shown. The system 10 comprises a hopper 12, a vibrating conveyor 14, a counting means 16, a processor 18, an on-off switch 25 that is under control of the processor 18 and controls the operation of the vibrating conveyor 14 and an interface 20 for interfacing with the system 10. The curved white block arrows indicate the movement of the conveyor.

The interface 20 may be a specially constructed device typically having a screen 22 for displaying data and a keypad 24 or the like for inputting data. The interface 20 may, however, conveniently be the screen and keyboard of a personal computer or laptop, in which case the processor will typically be the internal processor of the computer, but can also be an external, dedicated processor that receives its instructions from the processor of the computer. Either way, the interface 20 is coupled to the counting means 16 and to the on-off switch 25 via the processor 18 so that counts from the counting means 16 is an input to the processor and power (or the lack of it) to the vibrating conveyor 14 is an output thereof.

The processor 18 is also connected to a timer or clock 30.

It will be appreciated that the size of a dose is a function of time that power is supplied to conveyor 14 and the frequency and amplitude of vibrations that determines how many pills 5 are driven along the conveyor 14 and how long it takes for them to fall off the end 15. Controlling vibrations is however very difficult. The frequency and amplitude of the unloaded conveyor is different from that of the conveyor with particles on it. Where the particulate matter to be dispensed is pills or grains, then, being of fairly standard shape and size, the time taken to travel along conveyor 14 is fairly constant. Where objects to be counted are more random, such as rough diamonds (or cut gemstones for that matter), or sieved particles that have maximum and minimum grain size, but vary therebetween, and may have different densities, then the time to pass along conveyor may vary somewhat. Even where the amplitude and frequency of the conveyor cycle is controllable, calculating or modeling the effect of variation in these parameters on throughput is extremely complicated and inaccurate.

The pills 5 fall off the end of the conveyor 15 and fall, under gravity through a hole in a stage 35 into a container below. A counting means, such as an optical counter may be positioned under the stage 35.

One aspect of the present invention is the realization that the affect of simply switching the conveyor 14 on and off for a set period can be accurately estimated from the last throughput data for the same type of material. In other words, if when switching the conveyor on for 30 seconds, 389 pills were dispensed, then calculating and switching the machine on and off for one minute will be expected to dispense 788 pills. Based on this realization, it is possible, having seen the effect of 30 second pouring, to know that to complete a batch of 1000 pills, the machine should be switched on for sufficient time to pour a further (1000–389) pills, i.e. 611 pills which is, at the rate of 788 pills per minute, should take about 46½ seconds. It is assumed that by switching the machine on and off for a shorter period of time, the total will not be exceeded. If the machine is switched on for, say, a further 30 seconds, then approximately 389 pills will be dispensed. If this happens, then the exact number of additional pills—say 383 can be measured and the calculation redone. Thus, having now dispensed 772 pills, a further 228 are required and at adjusted rate of 766 pills a minute, this should take a further 17.86 seconds. In this manner, the system can self adjust to most recent data to calculate throughput, can home in on desired dosage without overshooting by more than one or two particles.

Figure 2:
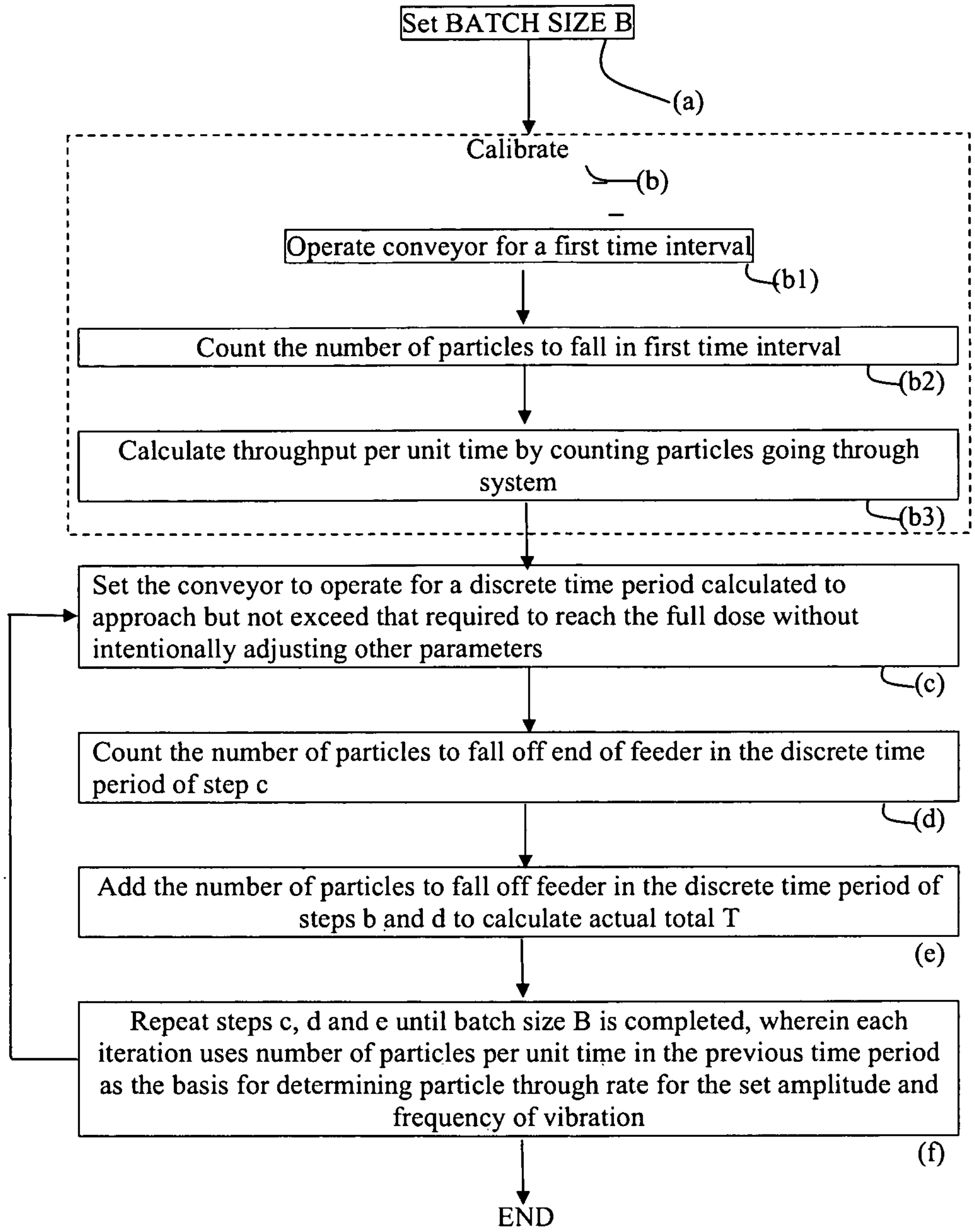
FIG. 2 is a flowchart showing a counting algorithm of the invention.

With reference to FIG. 2, the algorithm for counting objects in accordance with the present invention consists of the following algorithm:

(a) setting a batch size B (b) calibrating the system by operating the conveyor 14 for a first time interval (b1) counting the number of particles N to fall in first time interval (b2) and calculating the throughput per unit time by counting particles going through the system (b3) using the counting means 16

As is generally the case if the operator sets reasonable numbers based on experience etc., if the first pouring N is less than the batch size B, there is no reason to discard the first pouring and the batch B can be made up by adding to N. The first batch can, of course, be discarded. Also, in steady usage in industry, particles of the same size and density distribution (where all particles may be essentially similar as is the case with, say, tablets, or different, as is the case with, say diamonds) will be batched in similar sized batches for a long run, and then in a different size batch, time and time again.

The conveyor 14 is set to operate for a discrete time period t calculated to approach but not exceed that required to reach the full dose or batch size B without intentionally adjusting other parameters (step c). In other words, the amplitude and frequency of conveyor 14 vibration are not adjusted, even if possible to do so. Clearly, these do, however, fluctuate slightly, such as when the number, size and mass of particles thereupon changes. Indeed, because of power fluctuations, it will be noted that even the voltage of the mains power may vary slightly.

The number of particles e.g. pills 5 poured is counted (step d) and this number is added to the running total T (step e). In practice the total is usually simply updated.

If $T<B$, i.e. where the running total is less than the batch size required, the machine is operated for a time period calculated so that B is approached but not exceeded (step f). In other words, the conveyor 14 is stopped and restarted over and over, repeating steps c to f. Once the batch size B is reached, i.e. $T=B$, or if the batch size is exceeded $T>B$, then the processes is stopped. In this manner, if not totally eliminated, over run is minimized, often to one or two particles, and well within 0.2% tolerances. Under-supply is avoided.

It is noted that the system of U.S. Pat. No. 5,768,327, incorporated herein by reference in its entirety, uses a counting system that could be used with the dosing algorithm described above and used as the counting means 16. Such a system consists of an apparatus for optically counting discrete objects, comprising:

a) a substantially vertical feeding channel having an upper end for receiving the objects;

b) first and second substantially collimated light sources arranged substantially orthogonally, substantially horizontally, and adjacent said feeding channel;

c) first and second photo-electric sensor arrays arranged substantially orthogonally, substantially horizontally, and adjacent said feeding channel such that light from said first light source is detected by said first sensor array and light from said second light source is detected by said second sensor array, each of said sensor arrays having an output;

d) processing means coupled to said outputs of said first and second sensor arrays for separately processing said outputs; and e) numeric display means coupled to the processing means for displaying a total count of the objects, wherein the objects which enter said feeding channel pass between the light sources and the sensor arrays to cast shadows on the sensor arrays, said processing means detects said shadows on said sensor arrays by separately processing said outputs of said sensor arrays, determines separate counts of how many objects have cast shadows on each of said sensor arrays, consistently chooses the larger or smaller of said separate counts, and increments the numeric display by the amount of the chosen larger or smaller count.

It will be appreciated that where an object obstructs the light path between a non-collimated source and a detector array, typically the size of the shadow on the detector array is a function of orientation, size of particle and its position vis a vis the light source and the detector, where the closer it is from the light source and the further it is from the light source, the larger the shadow. Traditionally, optical systems overcome these artifacts by using collimated light and viewing in two orthogonal directions.

Surprisingly, we have discovered that useful and valuable information may be obtained by using non-orthogonal systems and by using non-collimated light. The information includes unambiguous differentiation and exact counting of particles that fall together and can be miscounted as one, and size and shape of random shaped particles can be determined.

Figure 3:
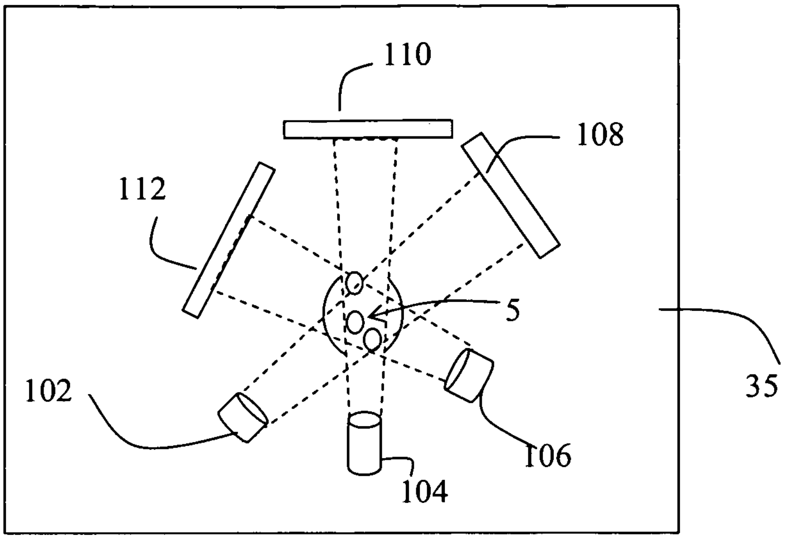
FIG. 3 is an illustration of an optical monitoring system of a preferred embodiment for use with system of FIG. 1.

With reference to FIG. 3 a prototype system featuring three coplanar horizontal divergent laser diodes 102, 104, 106 lined up with pixilated arrays 108, 110, 112 to track and count objects 5 falling there-between by the shadow of the object on the pixilated array is shown. The system is assembled under the stage 35 and above the receptacle for collecting the counted objects, and is used with controlling software that compares the count of the three images. In one embodiment, the largest number counted is always used. In another embodiment, the majority count is used. This may be the smaller or the larger number counted—in this case 3.

Figure 4:
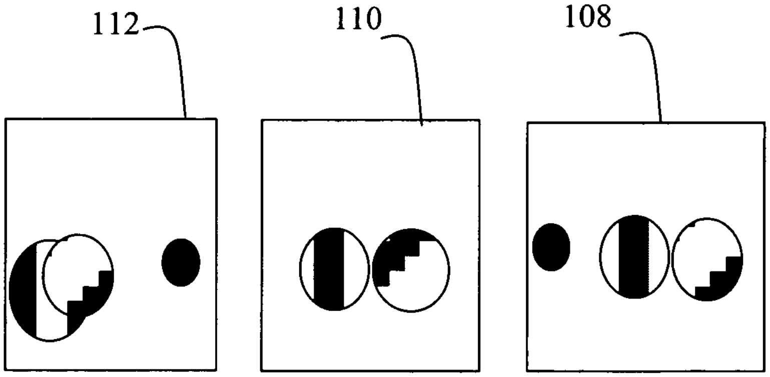
FIG. 4 shows the shadows of the objects projected onto the pixilated arrays.

The real time readings of the pixilated arrays are shown in FIG. 4.

Such a system differs from the prior art system described in U.S. Pat. No. 5,768,327 since it features three non-collimated beams that are not orthogonal (i.e. mutually perpendicular) to each other in a horizontal plane, and the algorithm for counting is not simply the larger or smaller reading, but, rather three majority count, i.e. that done by two of the three sensors is used. Alternatively the largest number counted can be used. Alternatively real time image analysis can be sued to compare the three images and to deduce the correct number.

Features shown with some specific embodiments may be incorporated with other embodiments. Thus the scope of the present invention is defined by the appended claims and includes both combinations and sub combinations of the various features described hereinabove as well as variations and modifications thereof, which would occur to persons skilled in the art upon reading the foregoing description.

In the claims, the word "comprise", and variations thereof such as "comprises", "comprising" and the like indicate that the components listed are included, but not generally to the exclusion of other components.

We claim:

1. A method for dispensing a set number of items as a batch, the method comprising the steps of:

(a) setting the set number of items in the batch;

(b) calibrating by (b1) forwarding items along a conveyor for a time interval;

(b2) counting the number of items to fall off an end of the conveyor in the time interval;

(b3) calculating throughput per unit time;

(c) setting the conveyor to operate for a discrete time period calculated so that a number of items dispensed reaches but does not exceed the set number, without adjusting one or more of a conveyor amplitude setting and a conveyor frequency setting;

(d) counting the number of items dispensed in the discrete time period of step c;

(e) adding the number of items to fall off the conveyor in the discrete time period of step c to the number of items dispensed; and (f) repeating steps c, d and e until the number of items dispensed is greater than or equal to the set number, wherein each iteration of step f uses the number of particles per unit time in the preceding discrete time period as a basis for determining a new item throughput rate for calculating a subsequent discrete time period for operating the conveyor.

2. The method of claim 1 wherein the objects are counted using an apparatus for optically counting discrete objects, comprising:

a) a substantially vertical feeding channel having an upper end for receiving the objects;

b) first and second substantially collimated light sources arranged substantially orthogonally, substantially horizontally, and adjacent said feeding channel;

c) first and second photo-electric sensor arrays arranged substantially orthogonally, substantially horizontally, and adjacent said feeding channel such that light from said first light source is detected by said first sensor array and light from said second light source is detected by said second sensor array, each of said sensor arrays having an output;

d) processing means coupled to said outputs of said first and second sensor arrays for separately processing said outputs; and e) numeric display means coupled to said processing means for displaying a total count of the objects, wherein the objects which enter said feeding channel pass between said light sources and said sensor arrays to cast shadows on said sensor arrays, said processing means detects said shadows on said sensor arrays by separately processing said outputs of said sensor arrays, determines separate counts of how many objects have cast shadows on each of said sensor arrays, consistently chooses the larger or smaller of said separate counts, and increments the numeric display by the amount of the chosen larger or smaller count.

3. The method of claim 1 wherein the particles are counted whilst falling, using an optical system comprising at least one light source incident on an individual pixilated array.

4. The method of claim 3 wherein said optical system further comprises two light source-array pairs arranged non-perpendicularly.

5. The method of claim 3 wherein said optical system further comprises three light source-array pairs arranged non-perpendicularly.

6. The method of claim 3 wherein said optical system further comprises three light source-array pairs wherein at least two light source-array pairs are arranged non-perpendicularly.

7. The method of claim 3 wherein said at least one light source is non-collimated.

8. The method of claim 3 wherein said at least two light sources are non-collimated.

9. The method of claim 3 wherein said at least three light sources are non-collimated.

10. The method of claim 3 wherein comparison of output of the pixilated arrays enables accurate determination of number of falling particles, individual resolution of separate particles falling together, and, shape of particles.

11. The method of claim 10 wherein where acceptable particles are approximately identical in size and shape, rejected particles are clearly identified and their numbers in the sample is determinable.

12. The method of claim 10 wherein images of rejected particles from pixilated arrays are stored in a memory for subsequent analysis.

* * * * *